April 10, 1934.　　　J. C. ZEDER　　　1,954,190
YIELDABLE DRIVING CONNECTION
Filed Dec. 17, 1930

INVENTOR
JAMES C. ZEDER.
BY
ATTORNEY

Patented Apr. 10, 1934

1,954,190

UNITED STATES PATENT OFFICE 1,954,190

YIELDABLE DRIVING CONNECTION

James C. Zeder, Detroit, Mich., assignor to Chrysler Corporation, Detroit, Mich., a corporation of Delaware Application December 17, 1930, Serial No. 503,030

3 Claims. (Cl. 192—68)

This invention relates to an improved driving connection, particularly for yieldably connecting a clutch disc to a shaft.

In a yieldable connection of this kind, it has been the practice to employ a rubber cushioning element between registering, rigid members on a clutch disc and on its shaft, respectively, which are placed under compression and subjected to the full torsional load that is applied on the clutch disc during operation. Firm and only slightly yieldable rubber compositions are employed in order to withstand the severe and repeated compressions to which cushions of this type are subjected and as a result, they lack the yieldability and sensitivity that is necessary to absorb torsional impulses and rattling which are produced when torsional impulses of small intensities are applied on the connections and therefore, rattling of the clutch parts during the low torque range is not avoided. The rigidity required to produce the desired endurance capacities under high torque conditions also prevents a sufficient degree of sensitivity in the connection to absorb that impact to which it is initially subjected when a severe torsional force, as for example during initial application of the clutch disc to its co-operating member, is applied on the connection.

The main objects of this invention are to provide an improved yieldable element in a driving connection; to provide a yieldable member that has two distinct deflection rates under the torsional forces to which it is subjected in operation; to provide a rubber member of this kind; to provide a thin layer of yieldable rubber having a large deflection rate for absorbing vibrations and rattles during the minimum torque zone and a comparatively thicker layer of substantially rigid rubber for withstanding the maximum torque reaction and supplying the desired endurance capacity in the connection.

An illustrative embodiment of the invention is shown in the accompanying drawing, in which.

Figure 1:
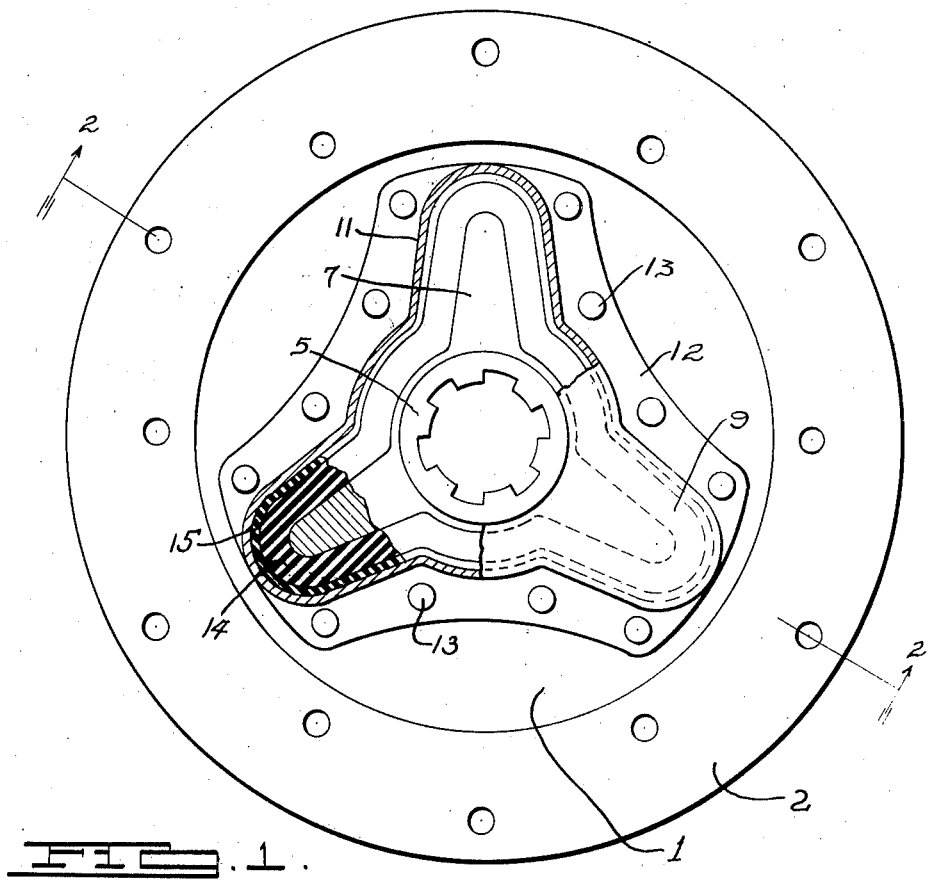
Fig. 1 is a side elevation of a clutch disc showing my improved driving connection therefor partly in section.
Figure 2:
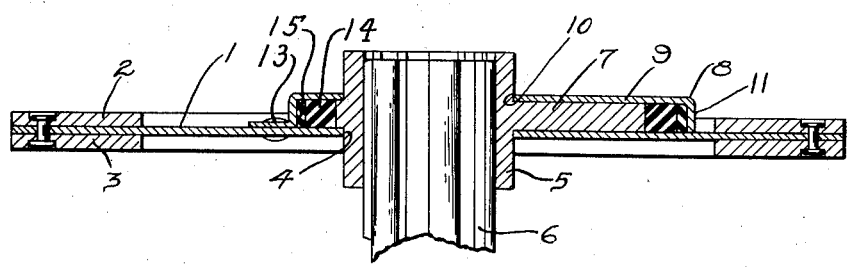
Fig. 2 is a transverse section taken on the line 2—2 of Fig. 1.

In the form shown, my improved driving connection is illustrated in conjunction with a clutch disc 1 of the type commonly used in vehicle construction having frictional lining rings 2 and 3 on its respectively opposite sides. The disc 1 is provided with a central aperture 4 for receiving an internally splined collar 5 which is normally mounted on a driven shaft 6. Integrally formed on the exterior of the collar 6 are radially extending lugs 7. In the form shown, three such lugs are provided, although any desired number may be used.

Mounted on the disc 1 is an inverted cup-shaped casing 8 having a wall 9 which is substantially parallel to the plane of the disc 1. The casing 8 has a central opening 10 for receiving the collar and its shape conforms substantially with the contour of the collar and its integral lugs 7. The side walls 11 of the casing 8 are substantially normal to the plane of the disc and they are spaced from the periphery of the collar, sides and extremities of the lugs 7, as shown in Fig. 1. The side walls 11 of the casing 8 are provided with flanges 12 which are seated upon the disc 1 and rigidly secured thereto by rivets 13.

Located in the space between the outer surfaces of the hub composed of the collar 5 and lugs 7, and the interior surfaces of the casing 8 is a yieldable cushioning member preferably comprising an inner layer 14 of a rubber composition which is only slightly yieldable and which has a low deflection rate and an outer thinner layer 15 of yieldable rubber having a comparatively high deflection rate.

In operation, when the clutch disc is rotated by engagement with a driving member (not shown) such as the fly wheel in a conventional vehicle the rubber cushioning member transmits the torsional forces from the clutch disc to the shaft 6. The outer layer of comparatively yieldable rubber is sufficiently sensitive to absorb the rattling and vibration which tends to occur during operation of the driving connection under low torsional forces, as the torsional reaction on the yieldable member is increased, the inner layer 14, being sufficiently rigid to withstand the maximum torque to which the connection is subjected, provides the necessary endurance capacity required in connections of this type.

By employing in a clutch element a yieldable driving connection including a layer of comparatively soft rubber which naturally has a low resiliency and a layer of yieldable, yet substantially firmer rubber, which has a comparatively higher resiliency, synchronizing of the relatively high frequency vibratory impulses with the relative movement of the parts of the clutch element is practically eliminated. The relatively harder rubber layer of the yieldable driving connection will withstand the substantially high torque reaction applied on the clutch element when the latter is engaged and a normal load is being transmitted therethrough, but the hardness of this rubber layer required to accomplish this purpose renders it unsuitable as a high frequency vibration damping means. The layer of soft rubber of low resiliency does not recover rapidly from deformation and therefore the successive rebound forces created during compression and recovery of the soft rubber cannot occur at a high frequency. This characteristic of a soft rubber layer is taken advantage of in preventing the high frequency vibratory impulses which are created during engagement of the clutch element with a driving member, from synchronizing with the relative movements of the parts of the clutch disc. When such non-synchronous relation is brought about, the highly objectionable performance known as clutch chatter is materially reduced.

Although but one specific embodiment of this invention has herein been shown and described, it will be understood that various changes in the size, shape and arrangement of parts may be made without departing from the spirit of my invention and it is not my intention to limit its scope other than by the terms of the appended claims.

What I claim is:

1. A clutch element including a hub portion and a relatively rotatable clutch disc adapted to be rotated by frictional engagement with a driving member, spaced registering rigid members on said disc and hub portion respectively, and means between said members for providing a yielding rotative driving connection therebetween including at least two layers of rubber, the rubber of one of said layers having a low resiliency for establishing a non-synchronous relation between the relative movement of said clutch disc and the vibratory impulses applied thereon during engagement of said clutch disc and the other rubber layer being substantially firm.

2. In combination with a rotatable driven clutch member, a driven clutch element having a hub portion non-rotatably mounted on said driven member and a relatively rotatable disc portion adapted to be rotatably driven by frictional engagement with a driving member, said clutch and hub portions having registering opposed rigid faces for limiting rotation of said disc portion with respect to said hub portion, and a yieldable driving connection between said faces for transmitting torque from said disc portion to said hub portion and including a layer of soft rubber having a comparatively low built-up rate and resiliency for absorbing shock when the torque applied on said disc portion is comparatively low and for establishing a non-synchronous relation between said relative movement of said disc element and the relatively high frequency vibratory impulses applied thereon during engagement of said disc portion with a driving member and including a layer of substantially harder rubber having a high built-up rate and resiliency for absorbing shock during high torque reactions.

3. A rotative power transmitting member including a pair of relatively rotatable parts, one having means thereon for operatively connecting it with a driving member and the other having means thereon for operatively connecting it with a driven member, spaced registering rigid members on said parts, and means between said rigid members for providing a yieldable rotative driving connection therebetween including at least two layers of rubber, the rubber of one of said layers having a low resiliency for establishing a non-synchronous relation between the relative movements of said parts and the vibratory impulses applied thereon and the other rubber layer being substantially firm.

JAMES C. ZEDER.